(12) United States Patent
Shiomi et al.

(10) Patent No.: US 7,322,866 B2
(45) Date of Patent: Jan. 29, 2008

(54) OUTBOARD ENGINE

(75) Inventors: Kazuyuki Shiomi, Wako (JP); Tetsuro Ikeno, Wako (JP); Takeshi Okada, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/506,592

(22) Filed: Aug. 18, 2006

(65) Prior Publication Data

US 2007/0042653 A1  Feb. 22, 2007

(30) Foreign Application Priority Data

Aug. 22, 2005  (JP) .......................... P2005-240032

(51) Int. Cl.
*B63H 20/32* (2006.01)
*B63H 21/36* (2006.01)

(52) U.S. Cl. .......................................... 440/76; 440/78

(58) Field of Classification Search .............. 440/74–78
See application file for complete search history.

(56) References Cited

U.S. PATENT DOCUMENTS 3,153,397 A * 10/1964 Mattson et al. ................ 440/76
5,370,564 A * 12/1994 Fujimoto et al. .......... 440/89 R
5,472,361 A * 12/1995 Fujimoto et al. .......... 440/89 R

FOREIGN PATENT DOCUMENTS

| JP | 47-9194 | 10/1972 |
| JP | 05-319386 | 12/1993 |

* cited by examiner

*Primary Examiner*—Lars A. Olson
*Assistant Examiner*—Daniel V. Venne
(74) *Attorney, Agent, or Firm*—Carrier, Blackman & Associates, P.C.; William D. Blackman; Joseph P. Carrier (57) ABSTRACT

An outboard engine comprises a power source inside a power source compartment. The power source room is formed by an upper cover and an undercover. A buoyant body is disposed outside the power source compartment, and has a lower surface wall in a position that is lower than the undercover. The buoyant body is provided separately from the upper cover.

19 Claims, 9 Drawing Sheets

FIG.9

OUTBOARD ENGINE

CROSS-REFERENCE TO RELATED APPLICATIONS

The present invention claims priority under 35 USC 119 based on Japanese Patent Application No. 2005-240032, filed Aug. 22, 2005, the disclosure of which is incorporated by reference.

FIELD OF THE INVENTION

The present invention relates to an outboard engine mounted on the stern of a boat, and more particularly relates to an outboard engine provided with a buoyant body so as to lift the outboard engine upward to allow the boat to move smoothly from a standstill state.

BACKGROUND OF THE INVENTION

When a boat that moves by the use of an outboard engine is at a standstill and begins to move, the level of the stern of the boat drops and sinks into the water, and the bow rises and is tilted upward. Since the hull therefore begins to move in a tilted state, the water resistance is considerable when traveling starts, and adequate boat speed cannot be obtained. The stern must rise upward a certain amount, and the orientation of the boat must become approximately horizontal in order to reach a certain level of speed. There is a problem in that time is required for the boat to approximate an orientation that is nearly horizontal, and the boat cannot smoothly accelerate.

An outboard engine that can improve the acceleration characteristics of a boat is disclosed in Japanese Patent Laid-Open Publication No. 5-319386 (JP-5-319386A) and Japanese Utility Model Laid-Open Publication No. 47-9194 (JP-UM-47-9194A).

In the outboard engine of JP-5-319386A, an engine, a vertically disposed drive shaft and other drive components, and transmission components are covered by a vertical cowling. A propulsion casing is disposed below the lower cowling so as to provide vertical linkage. When the boat is at a standstill, a portion of the lower cowling is submerged, and when the boat is moving, only the propulsion casing is submerged.

In the outboard engine of JP-UM-47-9194A, the waterproof engine casing that covers the engine is formed having a size that is sufficient to provide flotation to the engine, and the engine is designed to float on the surface of the water.

In the outboard engine of the JP-5-319386A, however, a portion of the lower cowling that forms the engine compartment is structured to submerge, and it is therefore difficult to endow this structure with water tightness when the lower cowling is assembled. When water has furthermore flooded the engine compartment, it is difficult to drain the water, the movement of movable components is compromised by water and salt, and the components tend to corrode.

The outboard engine mounted on the stern moreover has a structure in which the engine is covered with an upper and lower cowling, an extension case is provided below the lower cowling, and a gear case is disposed under the extension case. Therefore, the driving noise of the engine passes through the case and the cowlings, and is released to the periphery as engine noise. For this reason, there is a need to reduce the engine noise.

Thus, the depth of the outboard engine when the boat is at a standstill or is accelerating must be reduced, the orientation of the hull must be made to rapidly transition to an approximately horizontal state during acceleration, and smooth acceleration must be achieved without affecting the watertight structure of a leg body having a power source cover for accommodating an engine, electric motor, or another power source, and also having an extension case or the like disposed under the power source.

SUMMARY OF THE INVENTION

According to a first aspect of the present invention, there is provided an outboard engine that comprises a power source; an upper cover for covering a periphery of an upper half of the power source; an undercover for covering a periphery of a lower half of the power source; a power source compartment that accommodates the power source and that is formed by the upper cover and undercover; and a buoyant body that is disposed outside the power source compartment, has a lower surface wall positioned below the undercover, and is provided separately from the upper cover.

In addition to the engine described in the example, the above-described power source includes an electric motor, and a hybrid combination of an engine and the electric motor.

Thus, since the outboard engine of the present invention is provided with a buoyant body, the depth of the stern when the boat is at a standstill or moving at low speed is reduced, and the tilting of the hull is corrected so as to be nearly horizontal. The time required for exceeding the threshold during acceleration can therefore be shortened and smooth acceleration can be achieved. After acceleration, the buoyant body rises above the waterline, and therefore does not form a resistance in the water during travel, and high speed maneuverability is not compromised.

Since the buoyant body is formed by a different lower wall than the bottom of the power source compartment formed by the upper half of the undercover, the power source compartment does not need to be disposed below the waterline, and the power source compartment is not liable to be flooded.

The bottom of the power source compartment formed by the upper half of the undercover can be set above the waterline, and water can be drained from the power source compartment in a conventional manner.

The undercover preferably doubles as a portion of the buoyant body. The buoyant body is therefore integrally formed with the undercover; and integration with the outboard engine, retrofitting, and other configurations can be simplified.

The buoyant body is preferably provided separately from the undercover. The buoyant body can therefore be manufactured in fixed numbers as required; manufacturing and distribution efficiency is improved (yield improvement/reduction), and the user can mount the buoyant body at a later time.

Preferably, the outboard engine is further provided with an extension case that extends below the power source compartment, and the buoyant body is fastened to both the undercover and the extension case positioned below the undercover. The vibration characteristics of the undercover can be modified by the buoyant body, and noise produced by the vibration of the undercover can be reduced.

According to a second aspect of the present invention, there is provided an outboard engine that comprises a power source; an upper cover for covering a periphery of an upper half of the power source; an undercover for covering a periphery of a lower half of the power source; a power source compartment that accommodates the power source and that is formed by the upper cover and undercover; an extension case extending below the power source compartment; and a wall for covering a space between the extension case and an external surface of the undercover.

Thus, by covering the space between the leg body and the external surface of the undercover by using a wall, the internal noise that passes through the space is reduced.

According to a third aspect of the present invention, there is provided an outboard engine that comprises an engine; a drive shaft case that substantially vertically accommodates a drive shaft for transmitting motive force from the engine to a propeller; an exhaust channel which is disposed inside the drive shaft case and through which exhaust gas from the engine passes; and a noise reduction cover that has an arbitrary thickness and covers the drive shaft case.

Thus, the drive shaft case that houses the exhaust channel is covered with a noise reduction cover having a certain amount of thickness. The exhaust noise of the engine, machine noise inside the drive shaft case, and other types of noise can be reduced, and a reduction in the noise of the outboard engine can be assured. The noise reduction can be brought about in a simple configuration in which the periphery of the drive shaft case is covered by a noise reduction cover.

The noise reduction cover preferably covers an external side from a high position to a low position of the exhaust channel. The exhaust noise can therefore be effectively reduced.

Preferably, the outboard engine is furthermore provided with an engine cover for covering an upper half of the engine, and the noise reduction cover is disposed below a sealing surface of the engine cover. The engine noise and mechanical noise discharged below the engine can be effectively reduced.

The noise reduction cover preferably doubles as a buoyant body. Therefore, in addition to effectively reducing the noise of the outboard engine, the depth of the stern can be reduced when the boat is at a standstill or moving at very low speed, the tilt of the hull can be corrected so as to be nearly horizontal, and the depth resisted in the water during acceleration is reduced by an amount proportional to the proximity of the hull orientation to horizontal direction, whereby the time required for the boat to exceed the threshold during acceleration can be shortened and smooth acceleration achieved.

According to a fourth aspect of the present invention, there is provided an outboard engine that comprises an engine; a drive shaft case that substantially vertically accommodates a drive shaft for transmitting motive force from the engine to a propeller; an exhaust channel which is disposed inside the drive shaft case and through which exhaust gas from the engine passes; and a noise reduction cover having an external wall portion, an internal wall portion, and an intermediate layer disposed between the external and internal wall portions.

Thus, the drive shaft case, which houses the exhaust channel, is covered by a noise reduction cover having internal and external walls and an intermediate layer disposed between the walls. The exhaust noise of the engine, machine noise inside the drive shaft case, and other noise can be reduced, and a reduction in the noise of the outboard engine can be assured. The noise reduction can be brought about in a simple configuration in which the periphery of the drive shaft case is covered by a noise reduction cover.

BRIEF DESCRIPTION OF THE DRAWINGS

Certain preferred embodiments of the present invention will be described in detail below, by way of example only, with reference to the accompanying drawings, in which.

DETAILED DESCRIPTION OF THE PREFERRED EMBODIMENTS

Figure 1:
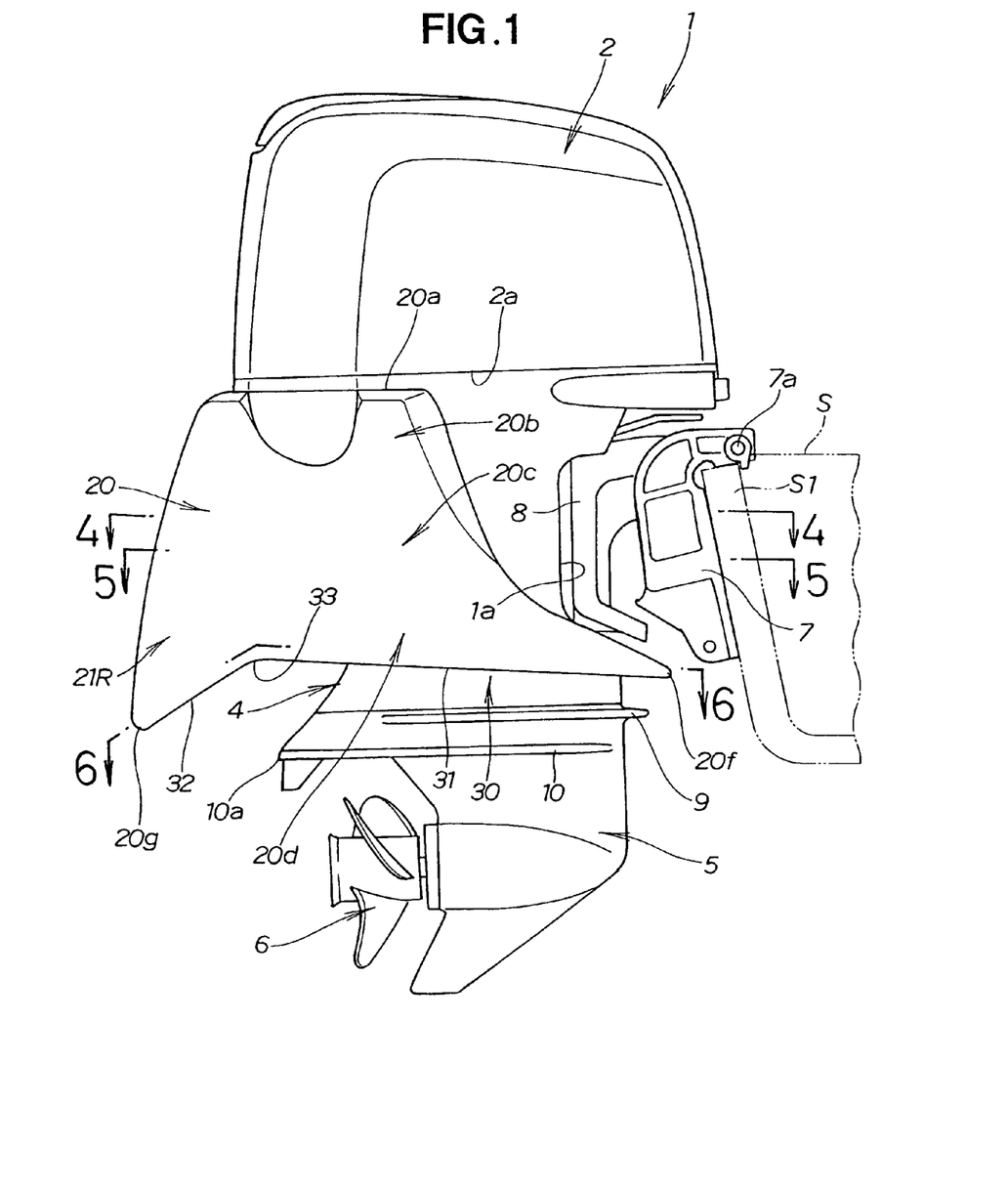
FIG. 1 is a side view of an outboard engine of the first example.
Figure 2:
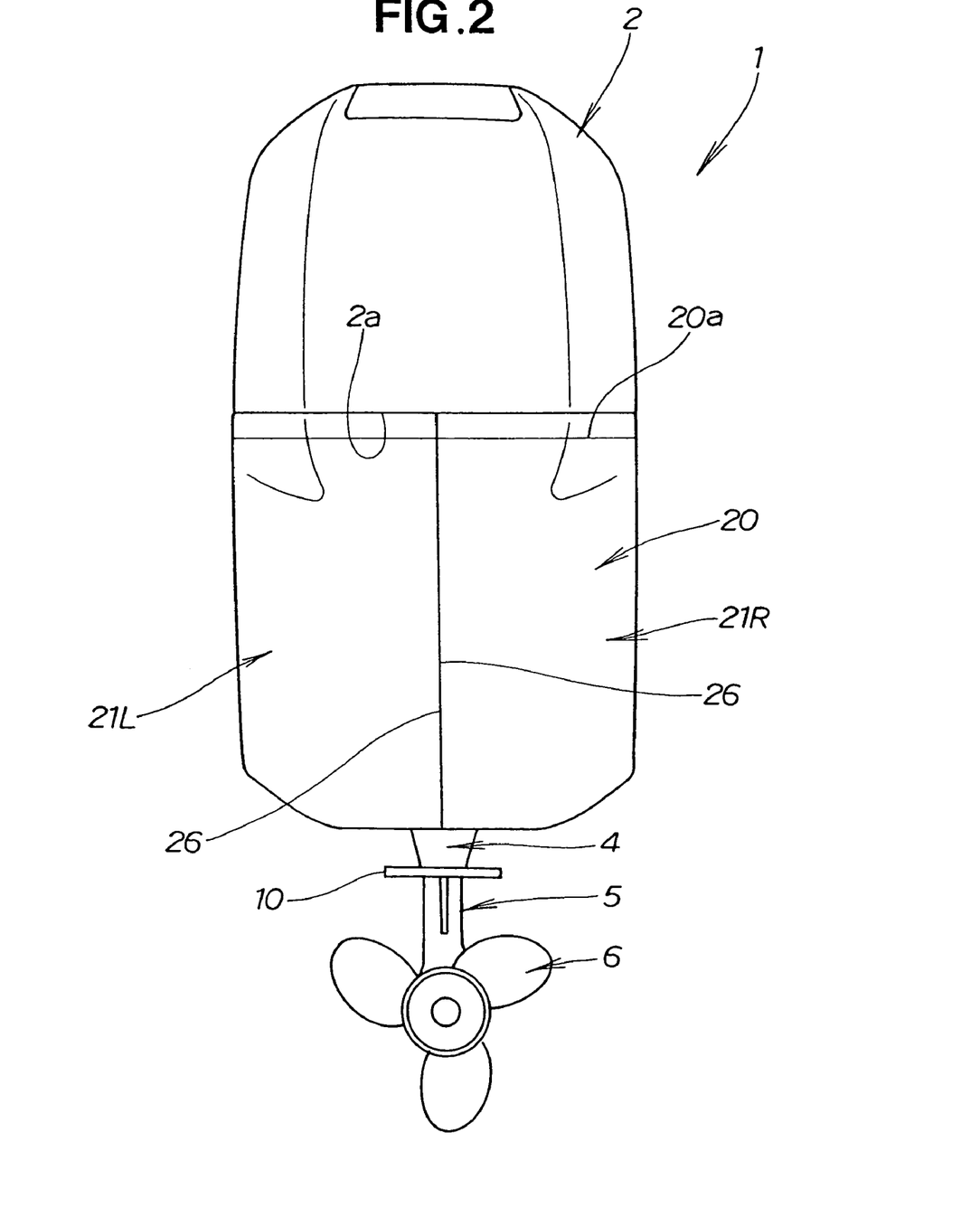
FIG. 2 is a rear view of the outboard engine shown in FIG. 1.
Figure 3:
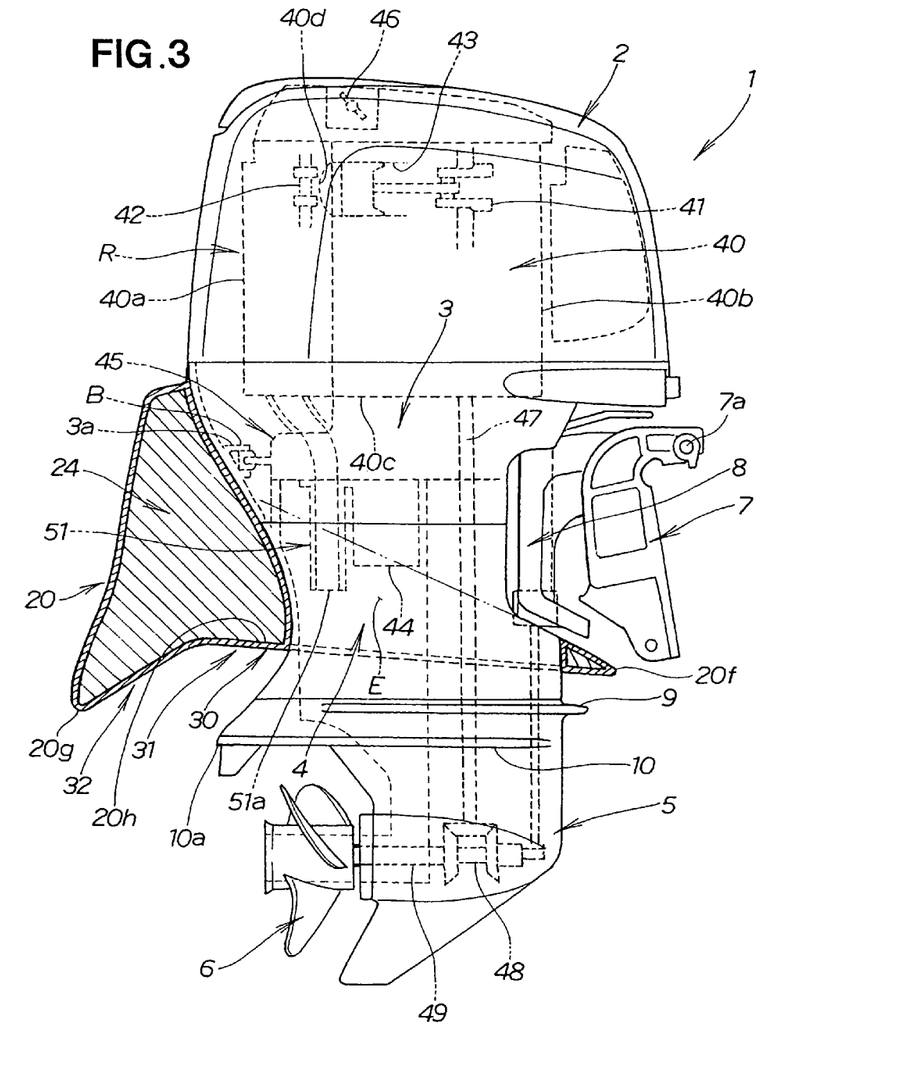
FIG. 3 is a cross-sectional view of the outboard engine shown in FIG. 1.

Referring to FIGS. 1 to 6 inclusive, an outboard engine 1 has an upper engine cover (top cover) 2 that covers the upper portion of an engine (power source) 40, and an undercover 3 that covers the lower portion of the engine 40, as shown in FIGS. 1, 2, and 3. A hollow engine compartment R is formed by and defined between the upper engine cover 2 and undercover 3. An extension case (leg body) 4, which is a drive shaft case, is disposed below the undercover 3. A gear case 5 having a propeller 6 for propulsion is disposed below the extension case 4.

A concavity 1a that is concave in the rearward direction of the outboard engine 1 is formed on the front portion of the extension case 4. The outboard engine 1 is mounted on the stern S1 of a hull S by way of a stern bracket 7. The stern bracket 7 is mounted on the concavity 1a. A swivel case 8 rotatably supports the outboard engine 1 in the horizontal direction. The outboard engine 1 furthermore swings vertically about a tilt shaft 7a mounted on the stern bracket 7.

An anti-splash plate 9 is formed on the upper external peripheral portion of the gear case 5. An anti-cavitation plate 10 extending so as to protrude from behind the propeller 6 is formed on the external periphery of the gear case 5 below the anti-splash plate 9.

The engine 40 is a vertical engine in which a crankshaft 41 and a cam shaft 42 are vertical, as shown in FIG. 3. The engine 40 is accommodated in the engine compartment R formed between the upper engine cover 2 and the undercover 3. The engine 40, in the depicted embodiment, is a multi-cylinder four-stroke engine in which a plurality of horizontally disposed cylinders 30 is arrayed in the vertical direction.

The engine 40 has an engine head 40a disposed in the rearward position of the outboard engine 1, and an engine main body 40b positioned in the longitudinally intermediate portion of the outboard engine 1. The engine head 40a includes a cylinder head and a head cover. The engine main body 40b includes a cylinder block and a crank case. The undercover 3 covers a bottom portion 40c, which is the lower portion of the upper engine cover 2. A mounting case 45 is disposed inside the undercover 3 and is used to house an oil pan 44.

A throttle valve 46 is part of an air intake device.

A drive shaft 47 passes vertically through the interior of the mounting case 45, extension case 4, and gear case 5. The drive shaft 47 rotatably drives the propeller 6 by way of a gear mechanism 48 and an output shaft 49 inside the gear case 5.

A combustion chamber 40*d* is formed by the engine head 40*a* and engine main body 40*b*. An exhaust channel 51 is in communication with the exhaust port of the combustion chamber 40*d*. An exhaust port 51*a* of the exhaust channel 51 extends to the vicinity of the vertically intermediate portion inside the extension case 4. The interior of the extension case 4 is an expansion chamber E.

A buoyant body 20 for preventing the stern S1 shown in FIG. 1 from dipping into the water when the boat is at a standstill and when the hull S is accelerating is mounted from the upper portion of the undercover 3 to the lower portion of the extension case 4 of the outboard engine 1 so as to encompass the external periphery of these components. The buoyant body 20 is mounted separately from the undercover 3. The front end portion 20*f* of the buoyant body 20 is positioned so as to protrude forward from the front end of the extension case 4, and the rear end portion 20*g* is positioned so as to protrude rearward beyond the propeller 6 and the rear end 10*a* of the anti-cavitation plate 10.

The buoyant body 20 has left and right buoyant body halves 21L and 21R divided on the left and right, as shown in FIG. 2. The right and left buoyant body halves 21L and 21R are mounted on the undercover 3 and extension case 4 by being joined together.

The lowest position B (referred to in the description below as "bottom") of the engine compartment R is formed by the undercover 3 and mounting case 45, as shown in FIG. 3. The buoyant body 20 has a lower surface wall 20*h* positioned further below the undercover 3, and has a closed space. The closed space has a voluminous portion that displaces water and imparts buoyancy to the outboard engine 1.

The inside wall of the buoyant body 20 may also be configured so as to share the wall of the undercover 3. In this case, a portion of the undercover 3 doubles as a part of the buoyant body.

The structure of the buoyant body 20 is described next with reference to FIGS. 4, 5, and 6. The left and right buoyant bodies 21L and 21R have left and right symmetrical shapes.

Figure 4:
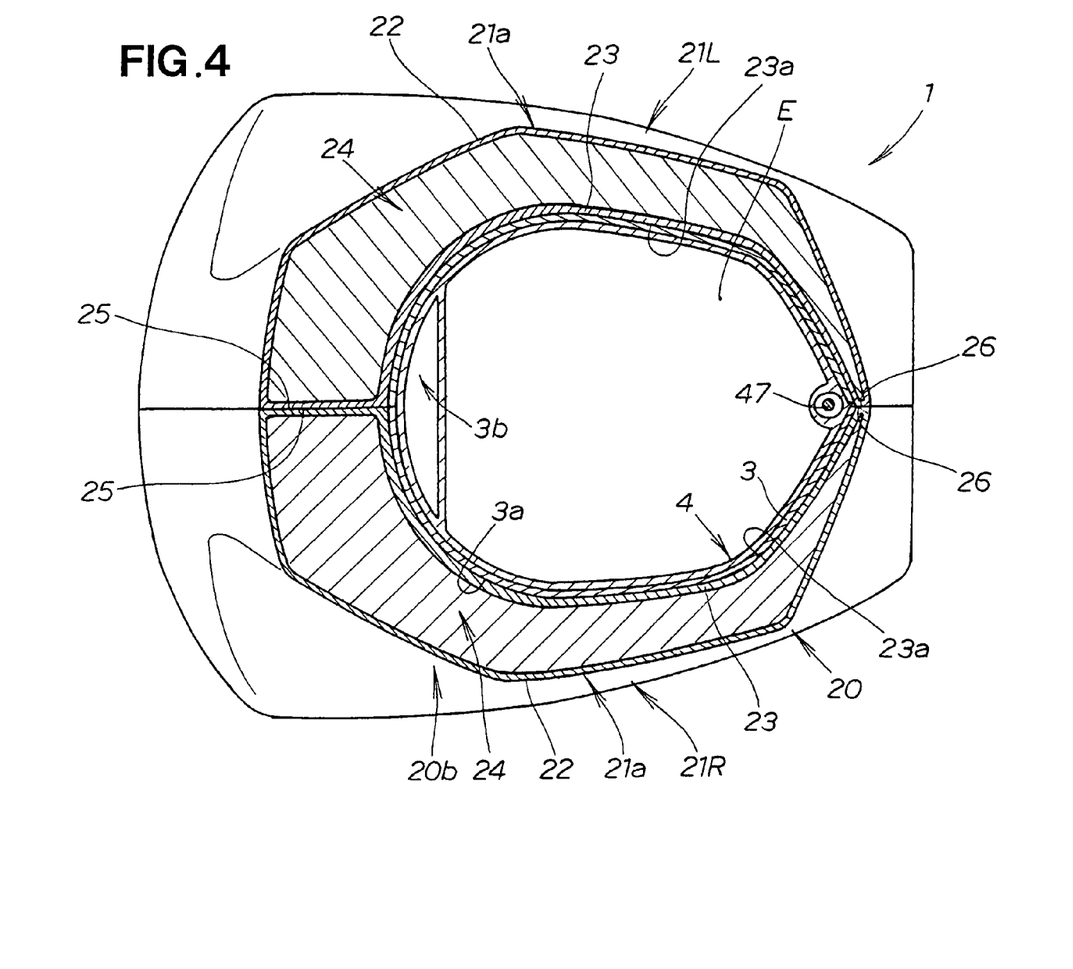
FIG. 4 is a cross-sectional view taken along line 4-4 of FIG. 1.

FIG. 4 shows a cross-section of the upper portion of the buoyant body 20. The longitudinal dimension of the upper portions 21*a* and 21*a* of the left and right buoyant bodies 21L and 21R is less than the longitudinal dimension of the intermediate and lower portions in the vertical direction shown in FIGS. 5 and 6.

The buoyant body halves 21L and 21R have a curved shape in which the outer portion bulges outward. The buoyant body halves 21L and 21R have an external wall 22 and an internal wall 23, and the walls 22 and 23 form a closed space. A buoyancy-imparting filler material 24, e.g., styrene foam, fills the closed space. A foam material that is composed of various resins, is lightweight, and has a lower specific gravity than water can be used as the foam material 24. The walls 22 and 23 may be continuously formed with the same member as the foam material 24. In this case, the extent of foaming of the foam inside the foam material 24 may be increased and made greater than [the extent of foaming] in the area of the inner wall and/or the vicinity of outer wall.

The inner surfaces 23*a* and 23*a* of the internal walls 23 and 23 are in close contact along the outer surface 3*a* of the undercover 3. The upper portion of the extension case 4 is positioned inside the undercover 3. The left and right buoyant body halves 21L and 21R have front and rear butted joint surfaces 25, 25, 26, and 26. The rear joint surface 25 is longer than the front joint surface 26 in the front/rear direction.

The width of the longitudinally intermediate portion in the upper portion 20*b* of the buoyant body 20 is greater than the width of the front and rear portions, and the intermediate portion has a shape that bulges outward to the two sides.

Figure 5:
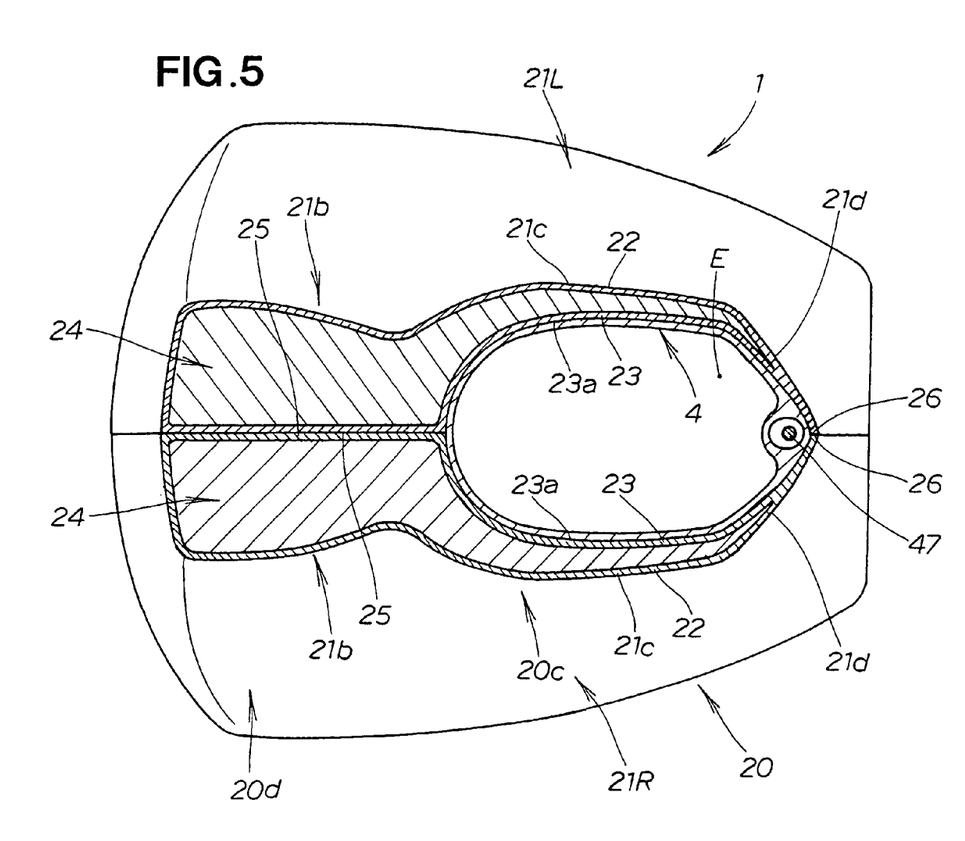
FIG. 5 is a cross-sectional view taken along line 5-5 of FIG. 1.

FIG. 5 shows a cross-section of the intermediate portion of the buoyant body 20 and extension case 4.

The rear portions 21*b* and 21*b* of the left and right buoyant body halves 21L and 21R in the vertically intermediate portion 20*c* of the buoyant body 20 have longitudinally extended joint surfaces 25 and 25 and are joined at the joint surfaces 25 and 25. The outer surface of the extension case 4 is in close contact with the inner surfaces 23*a* and 23*a* of the internal walls 23 and 23 of the left and right buoyant body halves 21L and 21R in the vertically intermediate portion 20*c* of the buoyant body 20.

The width gradually narrows from the intermediate portions 21*c* and 21*c* of the buoyant body halves 21L and 21R to the front portions 21*d* and 21*d*, and the left and right buoyant body halves 21L and 21R merge in the area of the front end joint surfaces (joint edges) 26 and 26.

Figure 6:
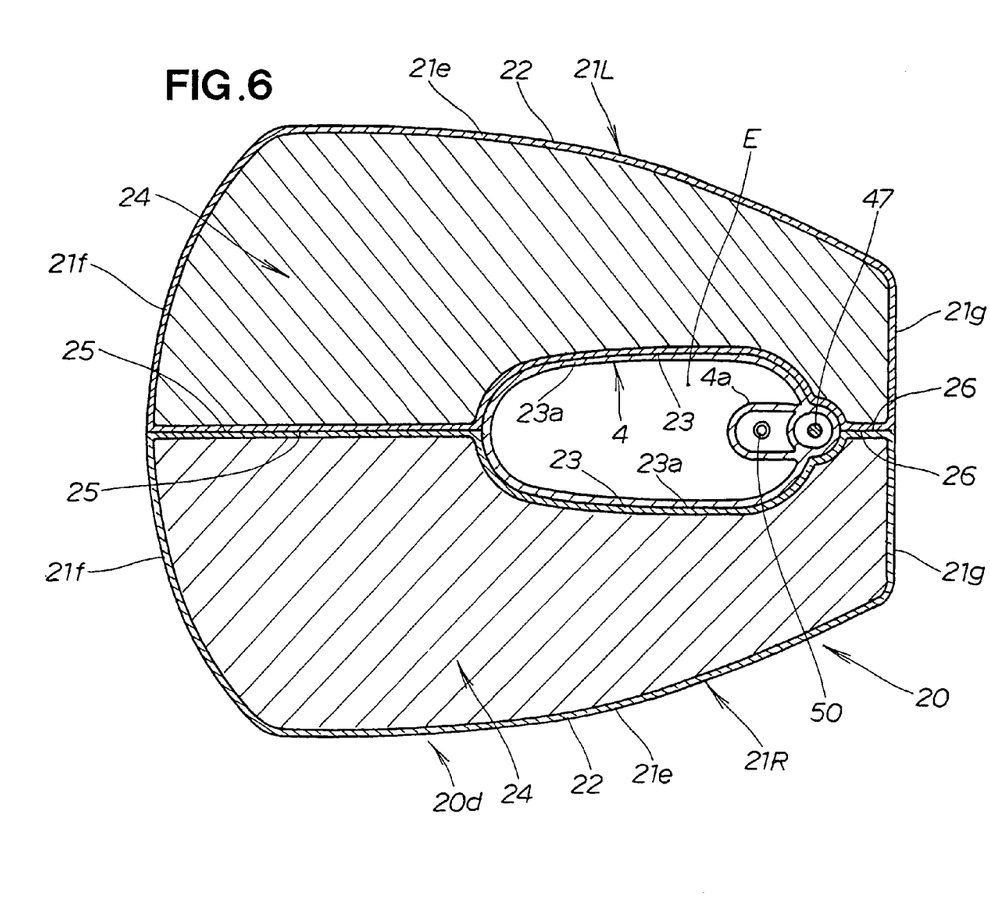
FIG. 6 is a cross-sectional view taken along line 6-6 of FIG. 1.

FIG. 6 shows a cross section of the lower portion area of the buoyant body 20.

The two external side surfaces 21*e* and 21*e* of the left and right buoyant body halves 21L and 21R extend slightly outward in the lower portion 20*d* of the buoyant body 20. The rear surfaces 21*f* and 21*f* are curved so that the joint surfaces 25 and 25 extend rearward in a joined state. The front surfaces 21*g* and 21*g* are flat when the joint surfaces 26 and 26 are joined.

A sub-expansion chamber 3*b* for idling is in communication with the outside air port (not shown), as shown in FIG. 4.

The drive shaft 47 is connected to the crankshaft 41 of the engine 40, as shown in FIGS. 3 to 6, and is vertically disposed so as to drive the propeller 6.

A water feed tube 50 for cooling the engine vertically passes through the interior of a partitioned dividing wall 4*a*, as shown in FIG. 6. The interior of the extension case 4 is an exhaust expansion chamber E.

In this manner, the lower portion 20*d* of the buoyant body 20 is disposed on the external periphery of the extension case 4 in an area of the buoyant body which extends downwardly from the undercover 3. The upper end 20*a* of the buoyant body 20 is designed so as to be positioned slightly lower than the lower end edge 2*a* of the upper engine cover 2, as shown in FIG. 1.

The lower portion 20*d* of the buoyant body 20 shown in FIG. 6 is wider than the upper portion 20*b* and intermediate portion 20*c*, and the amount of protrusion is greatest in the rearward direction and is least in the forward direction.

The lower surface 30 of the buoyant body 20 has a front half portion 31 that slopes downward at a somewhat gradual angle from the longitudinally intermediate portion toward the front portion, as shown in FIG. 1.

The lower surface 30 has a rear portion 32 that slopes rearward and downward from a bend portion 33 in the highest position of the front half portion 31. The lower surface 30 of the buoyant body 20 is curved in the form of a dogleg as viewed from the side. The buoyant body 20 can be formed in a low position on the outboard engine 1 by using the lower surface wall 20h (FIG. 3) that forms the lower surface 30, and the bottom B of the engine compartment R can be kept in a high position on the outboard engine 1.

In this manner, water presses against the outboard engine 1 while providing propulsion, and an upward lifting force is generated on the stern S1 because the rear portion 32 of the lower surface 30 of the buoyant body 20 is sloped.

The outboard engine 1 is naturally endowed with static buoyancy because of the buoyant body 20, and the lower surface 30 of the buoyant body 20 has an angle of attack with respect to the straight surface of the front half 31 due to the sloped surface of the rear portion 32.

Therefore, in addition to the buoyant force of the buoyant body 20 itself, an upward lifting force produced from below by the pressure [of water], i.e., a dynamic buoyancy operates and an effective lifting force is provided. The hull S can achieve smooth, horizontal travel by the buoyancy provided by this lifting force and the buoyant body 20.

The buoyant body 20 is externally mounted, rather than being mounted in the engine compartment R formed by the upper engine cover 2, as shown in FIG. 3. The depth of the outboard engine 1 in the water when the boat is at a standstill is reduced by the buoyancy of the buoyant body 20. The depth of the stern in the water is reduced by the buoyancy of the buoyant body 20 particularly when the boat is moving at low speed, and the tilt of the hull is corrected so as to be nearly horizontal.

In this manner, when the hull S has accelerated from low-speed travel, the buoyancy of the buoyant body 20 provides resistance against further sinking during acceleration, the time required to exceed the threshold is shortened by reducing the tilt, and smooth acceleration can be achieved. After acceleration, most of the buoyant body 20 appears above the waterline, water resistance is therefore not produced during travel, and high speed maneuverability is not compromised.

The buoyant body 20 is formed by the lower surface wall 20h of buoyant body 20 apart from the bottom B of the engine compartment R formed by the upper half of the undercover 3. Therefore, the engine compartment R does not need to be lowered below the waterline, the engine compartment is not liable to flood, and an area for draining water from the engine compartment R can be disposed above the waterline.

The external periphery of the extension case 4 from which exhaust noise is emitted due to the exhaust of the engine 40 is encompassed by the buoyant body 20, as shown in FIG. 3. The filler material 24 inside the buoyant body 20 functions as a noise prevention and noise-absorbing material. In other words, the buoyant body 20 also functions as a noise reduction cover. Specifically, the buoyant body 20 doubles as a noise reduction cover.

In the outboard engine 1, the engine 40 is covered by the upper engine cover 2 and other components, but the engine noise is emitted inside the extension case 4 by way of the exhaust pipe 51. However, since the extension case 4 is covered by the buoyant body 20, which functions as a noise reduction cover, exhaust noise is reduced.

The upper half end of the buoyant body 20 covers the external periphery of the undercover 3, and the mechanical noise produced by the engine and transmitted through the interior of the undercover 3 is therefore also reduced.

The outboard engine of the first example was described above, but the filler material of the buoyant body is not limited to the material described above, and a material may also be used that has a hollow interior and that provides rigidity to the inner and outer walls of the buoyant device. When importance is placed on its function as a noise reduction cover, the noise reduction cover may be formed from a thick sheet member. It is also possible to select a material with high noise-absorbing effect as the filler material.

A second example of the outboard engine is described next with reference to FIGS. 7 to 9.

The outboard engine 1 of the second example differs only in the shape of the buoyant body 20, and the configuration of other components is the same. Therefore, the same reference numerals are assigned to the same components as those in the first example, and a description thereof is omitted.

Figure 7:
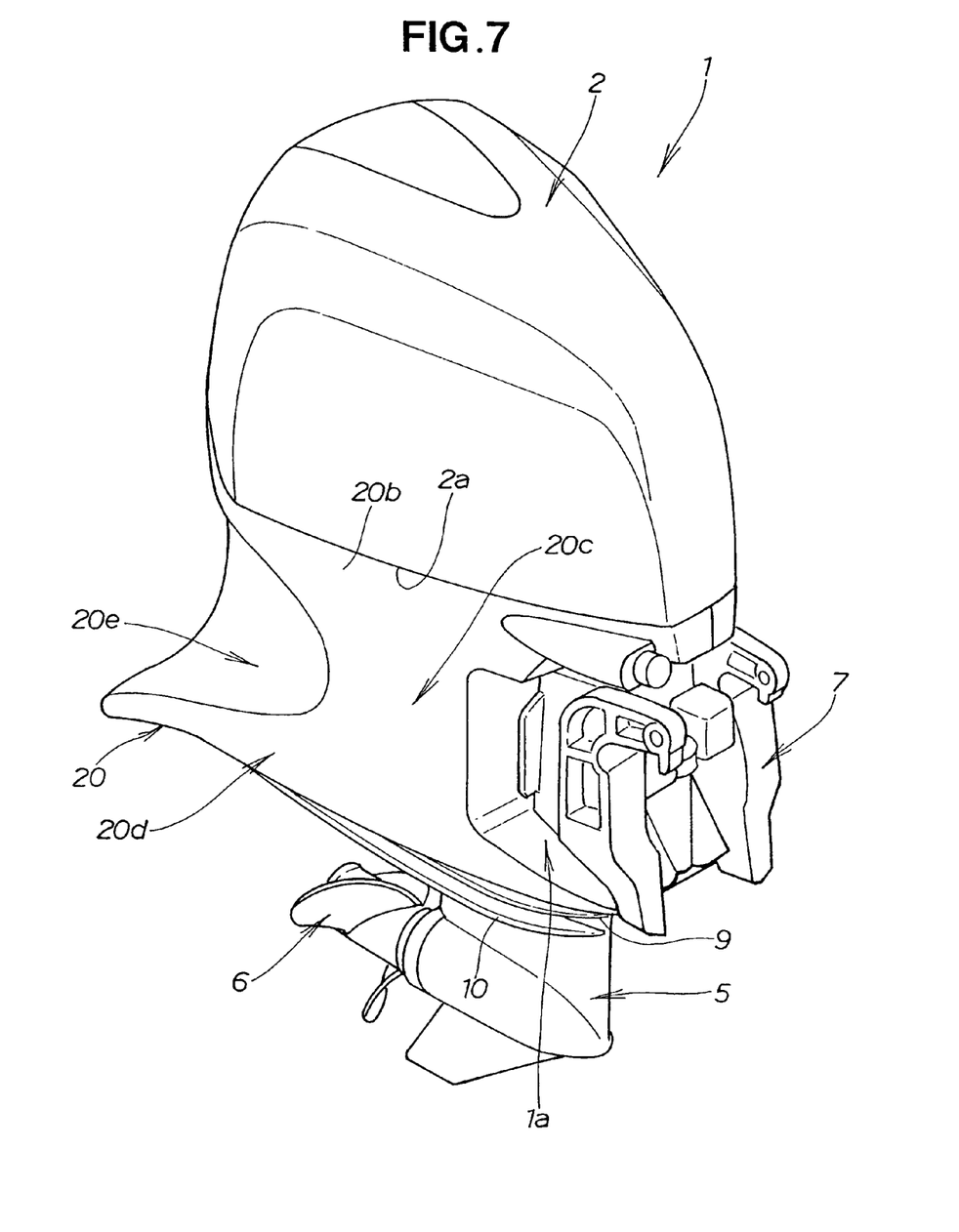
FIG. 7 is a perspective view of an outboard engine of the second example.
Figure 8:
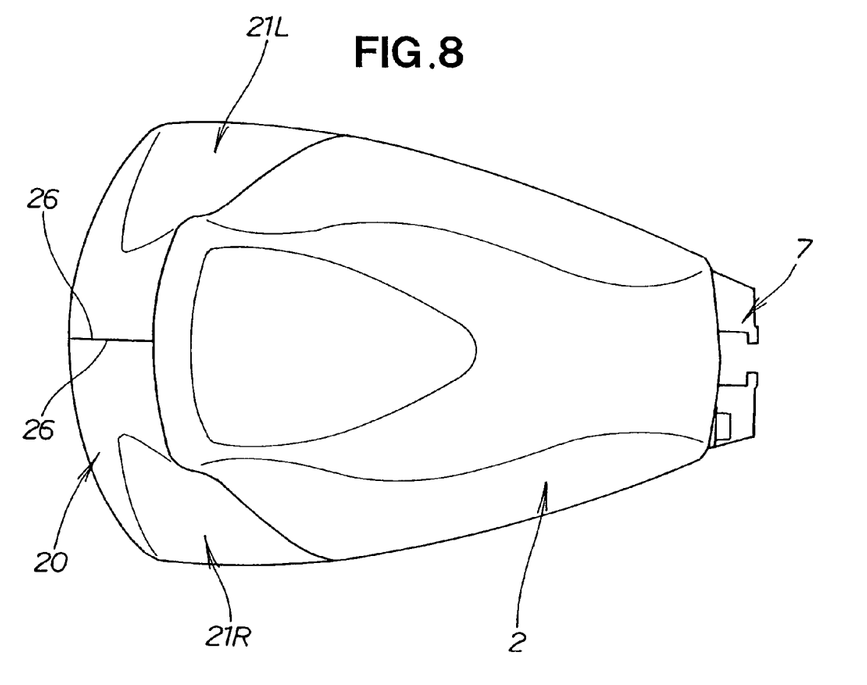
FIG. 8 is a plan view of the outboard engine shown in FIG. 7.
Figure 9:
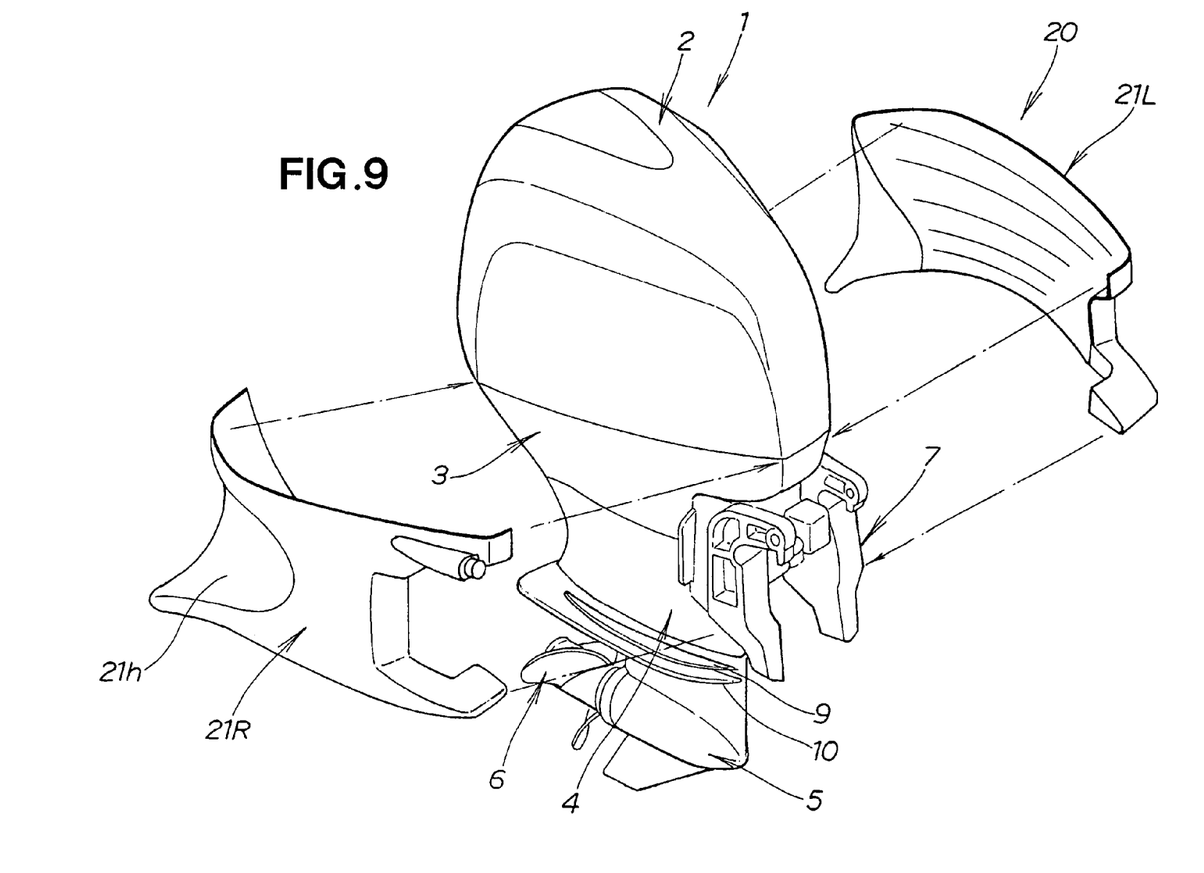
FIG. 9 is an exploded perspective view of the outboard engine shown in FIG. 7.

The two sides of the vertically intermediate portion of the rear portion of the buoyant body 20 of the second example has a concavity 20e formed substantially in a V-shape that vertically widens in the rearward direction, as shown in FIGS. 7 to 9. The concavity 20e is symmetrically formed as a concavity 21h (only one is shown) in the intermediate portion of the rear portion of the left and right buoyant body halves 21L and 21R. The concavity 20e of the buoyant body 20 reduces water resistance when the boat accelerates from a standstill.

Obviously, various minor changes and modifications of the present invention are possible in light of the above teaching. It is therefore to be understood that within the scope of the appended claims the invention may be practiced otherwise than as specifically described.

What is claimed is:

1. An outboard engine comprising:
   a power source;
   an upper cover for covering a periphery of an upper portion of the power source;
   an undercover for covering a periphery of a lower portion of the power source;
   wherein the upper cover and undercover cooperate to define a hollow power source compartment therebetween that accommodates the power source; and
   a buoyant body that is disposed outside the power source compartment, has a lower surface wall positioned below the undercover, and is provided separately from the upper cover;
   wherein the undercover has an internal wall and an external wall, and wherein the buoyant body is situated externally of the internal wall of the undercover.

2. The outboard engine of claim 1, wherein the undercover doubles as a portion of the buoyant body.

3. The outboard engine of claim 1, wherein the buoyant body is provided separately from the undercover, and wherein the buoyant body is situated externally of the external wall of the undercover.

4. The outboard engine of claim 3, wherein the buoyant body comprises an internal wall which is in close contact with an outer surface of the undercover.

5. An outboard engine comprising:
   a power source;
   an upper cover for covering a periphery of an upper half of the power source;
   an undercover for covering a periphery of a lower half of the power source;

a power source compartment that accommodates the power source and that is formed by the upper cover and undercover;

an extension case extending below the power source compartment; and a buoyant body having an interior wall for covering a space between the extension case and an external surface of the undercover, wherein selected portions of the buoyant body are in abutting contact with a right side, a left side, and a rear portion, respectively, of the undercover's external surface.

6. The outboard engine of claim 1, wherein the buoyant body comprises a left buoyant body half and a right buoyant body half which cooperate to sandwich a portion of the undercover therebetween.

7. The outboard engine of claim 6, wherein each of the left and right buoyant body halves has a curved shape with a medial portion which bulges outwardly.

8. The outboard engine of claim 1, wherein the buoyant body comprises an upper portion and a lower portion which is wider than the upper portion.

9. The outboard engine of claim 1, further comprising an extension case extending below the power source compartment, and the buoyant body is fastened to both the undercover and the extension case positioned below the undercover.

10. An outboard engine comprising:

an engine;

a propeller operatively connected to the engine;

an upper cover for covering an upper portion of the engine;

an undercover for covering a lower portion of the engine;

a drive shaft case that substantially vertically accommodates a drive shaft for transmitting motive force from the engine to the propeller;

an exhaust channel which is disposed inside the drive shaft case and through which exhaust gas from the engine passes; and a noise reduction cover that covers a portion of the drive shaft case, wherein the noise reduction cover includes an upper portion having a first width and a lower portion which is wider than the upper portion thereof;

wherein the noise reduction cover comprises a rear end portion which extends rearwardly beyond the propeller.

11. The outboard engine of claim 10, wherein the noise reduction cover covers an external side from a high position to a low position of the exhaust channel.

12. The outboard engine of claim 10, wherein the noise reduction cover is disposed below a sealing surface of the upper engine cover.

13. The outboard engine of claim 10, wherein the noise reduction cover doubles as a buoyant body.

14. The outboard engine of claim 10, wherein the buoyant body comprises a rear end portion which extends behind the undercover, the rear end portion having a lower surface wall which slopes downwardly behind and below the undercover.

15. The outboard engine of claim 10, wherein the buoyant body comprises a lower portion which is disposed on an external periphery of the extension case in an area of the buoyant body which extends downwardly from the undercover.

16. An outboard engine comprising:

an engine;

a propeller operatively connected to the engine;

a drive shaft case that substantially vertically accommodates a drive shaft for transmitting motive force from the engine to the propeller;

an exhaust channel which is disposed inside the drive shaft case and through which exhaust gas from the engine passes; and a noise reduction cover having an external wall portion, an internal wall portion, and an intermediate layer disposed between the external and internal wall portions;

wherein the noise reduction cover comprises a left buoyant body half and a right buoyant body half which cooperate to sandwich a portion of the drive shaft case therebetween;

and wherein the noise reduction cover comprises a rear end portion which extends rearwardly beyond the propeller.

17. The outboard engine of claim 16, wherein the noise reduction cover covers an external side from a high position to a low position of the exhaust channel.

18. The outboard engine of claim 16, further comprising an engine cover for covering the upper half of the engine, wherein the noise reduction cover is disposed below a sealing surface of the engine cover.

19. The outboard engine of claim 16, wherein the noise reduction cover doubles as a buoyant body.

* * * * *